US009871935B2

(12) United States Patent
Shiranita

(10) Patent No.: US 9,871,935 B2
(45) Date of Patent: Jan. 16, 2018

(54) IMAGE FORMING APPARATUS WITH INCLINATION ACCORDING TO FACIAL ORIENTATION

(71) Applicant: KYOCERA Document Solutions Inc., Osaka-shi, Osaka (JP)

(72) Inventor: Makoto Shiranita, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/337,993

(22) Filed: Oct. 28, 2016

(65) Prior Publication Data

US 2017/0126909 A1    May 4, 2017

(30) Foreign Application Priority Data

Oct. 30, 2015   (JP) ................. 2015-214172

(51) Int. Cl.
*H04N 1/00* (2006.01)
*G06K 9/00* (2006.01)

(52) U.S. Cl.
CPC ..... *H04N 1/00496* (2013.01); *G06K 9/00281* (2013.01); *H04N 1/00251* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 2006/0066891 | A1 | 3/2006 | Ikeda et al. | |
| 2010/0165382 | A1* | 7/2010 | Asano | G06K 9/00228 358/1.15 |
| 2014/0294421 | A1* | 10/2014 | Takahashi | G03G 15/5016 399/81 |

FOREIGN PATENT DOCUMENTS

JP      2006-088499 A    4/2006

* cited by examiner

*Primary Examiner* — Thomas D Lee
(74) *Attorney, Agent, or Firm* — Alleman Hall Creasman & Tuttle LLP

(57) ABSTRACT

An image forming apparatus includes an operation portion, an image capturing portion, a driving portion, a facial orientation detection portion, and an inclination control portion. The operation portion includes an operation surface to be operated by a user. The image capturing portion is configured to capture an image including a face of the user operating the operation portion. The driving portion is configured to change the inclination of the operation portion. The facial orientation detection portion is configured to detect a facial orientation of the user on the basis of an image captured by the image capturing portion. The inclination control portion is configured to control the driving portion on the basis of the facial orientation detected by the facial orientation detection portion.

4 Claims, 9 Drawing Sheets

IMAGE FORMING APPARATUS WITH INCLINATION ACCORDING TO FACIAL ORIENTATION

INCORPORATION BY REFERENCE

This application is based upon and claims the benefit of priority from the corresponding Japanese Patent Application No. 2015-214172 filed on Oct. 30, 2015, the entire contents of which are incorporated herein by reference.

BACKGROUND

The present disclosure relates to an image forming apparatus, and particularly to an image forming apparatus including an operation portion that is operated by a user.

In general, an image forming apparatus such as a copying machine or a multifunction peripheral is provided with an operation portion for the user to set print conditions or instruct a print start, for example.

An image forming system is also known that identifies a user who is approaching the image forming apparatus by performing facial recognition on the basis of an image captured by a video camera provided in the vicinity of the image forming apparatus, and ensures security and performs a print start in a timely manner for a print job issued by the user.

SUMMARY

An image forming apparatus according to an aspect of the present disclosure includes an operation portion, an image capturing portion, a driving portion, a facial orientation detection portion, and an inclination control portion. The operation portion includes an operation surface to be operated by a user. The image capturing portion is configured to capture an image including a face of the user operating the operation portion. The driving portion is configured to change the inclination of the operation portion. The facial orientation detection portion is configured to detect a facial orientation of the user on the basis of the image. The inclination control portion is configured to control the driving portion on the basis of the facial orientation detected by the facial orientation detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings to help understanding of the present disclosure. Note that the following embodiment is merely an exemplary embodiment of the present disclosure, and is not intended to limit the technical scope of the present disclosure.

Figure 1:
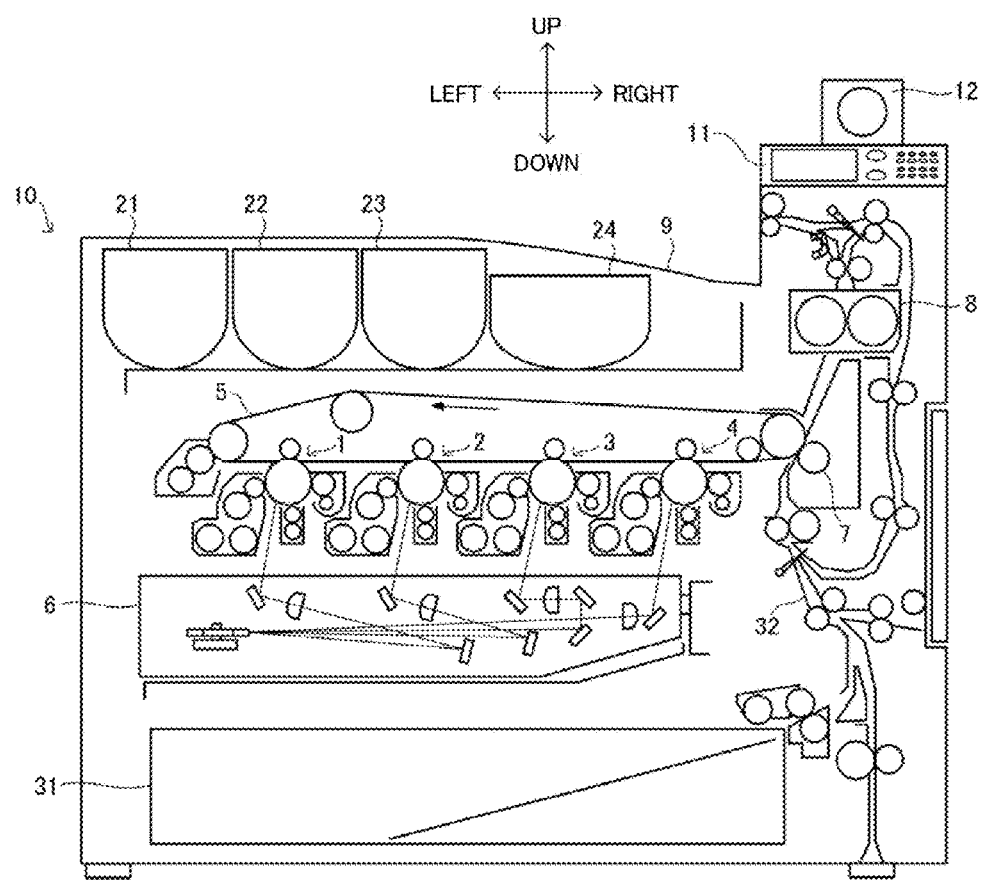
FIG. 1 is a diagram showing a configuration of an image forming apparatus according to an embodiment of the present disclosure.
Figure 3:
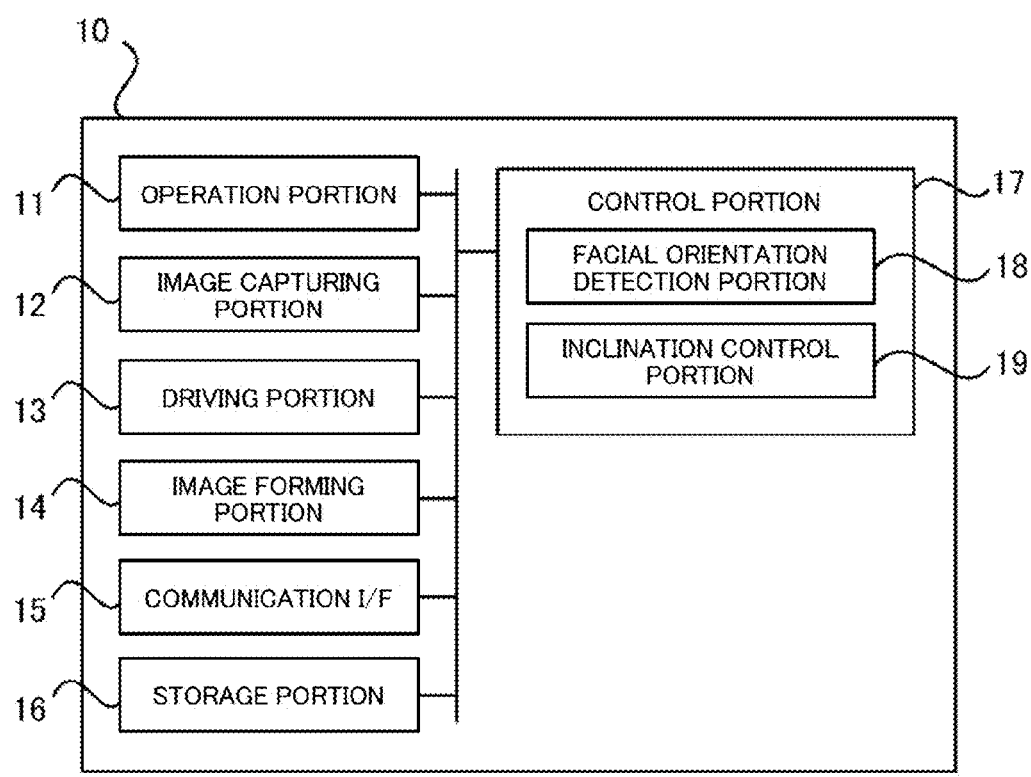
FIG. 3 is a block diagram showing a system configuration of the image forming apparatus according to the embodiment of the present disclosure.

As shown in FIGS. 1 and 3, an image forming apparatus 10 includes a plurality of sets of image forming units 1 to 4, an intermediate transfer belt 5, a laser scanning unit 6, a secondary transfer roller 7, a fixing device 8, a sheet discharge tray 9, an operation portion 11, an image capturing portion 12, a driving portion 13, an image forming portion 14, a communication I/F 15, a storage portion 16, a control portion 17, toner containers 21 to 24, a sheet feed cassette 31, a conveyance path 32, and so forth. The image forming apparatus 10 is a color printer that forms, on a sheet supplied from the sheet feed cassette 31 along the conveyance path 32, a color image or monochrome image based on image data inputted from an information processing device such as a personal computer. A facsimile, a copying machine, a multifunction peripheral, and the like are also examples of an image forming apparatus according to the present disclosure.

The image forming units 1 to 4 are arranged side by side along a traveling direction of the intermediate transfer belt 5, and constitute a so-called tandem-type image forming portion. Specifically, the image forming unit 1 forms a toner image corresponding to Y (yellow), the image forming unit 2 forms a toner image corresponding to M (magenta), the image forming unit 3 forms a toner image corresponding to C (cyan), and the image forming unit 4 forms a toner image corresponding to K (black).

Figure 2:
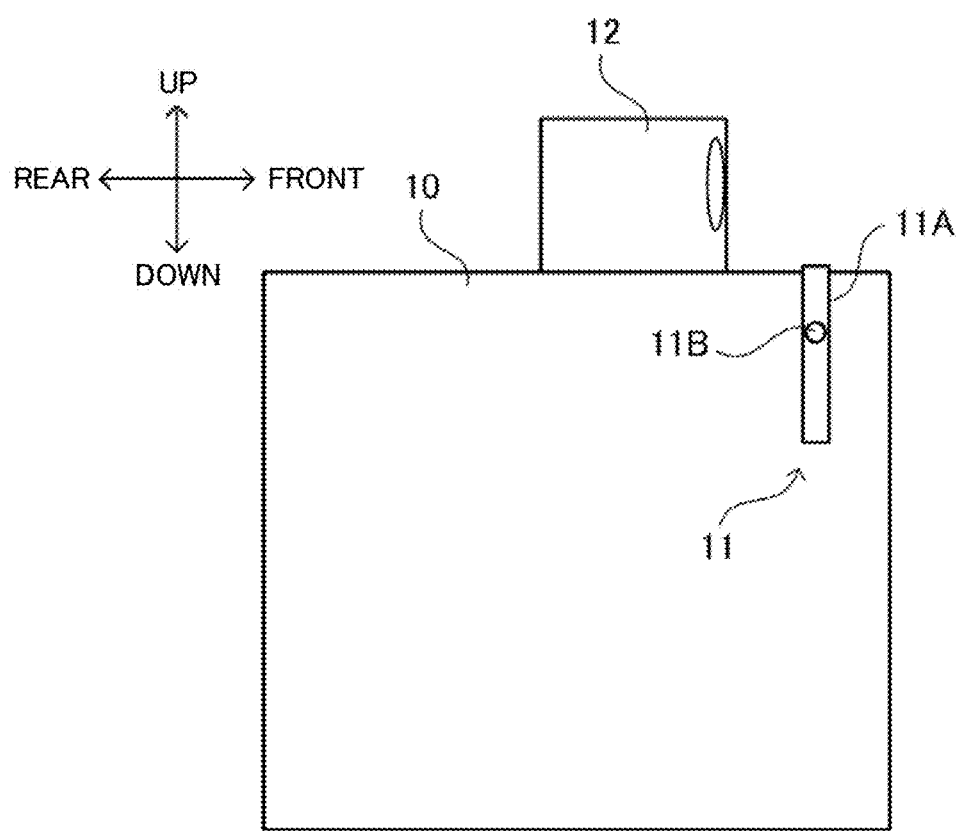
FIG. 2 is a schematic diagram showing an operation portion and an image capturing portion of the image forming apparatus according to the embodiment of the present disclosure.

As shown in FIG. 2, the operation portion 11 includes an operation surface 11A that is operated by the user. The operation surface 11A is provided with, for example, a display portion such as a liquid crystal display that displays information, and a touch panel and/or an operation button for receiving operation performed by the user. The operation portion 11 is configured to be rotatable about a rotational shaft 11B extending along the left-right direction shown in FIG. 1.

Figure 5:
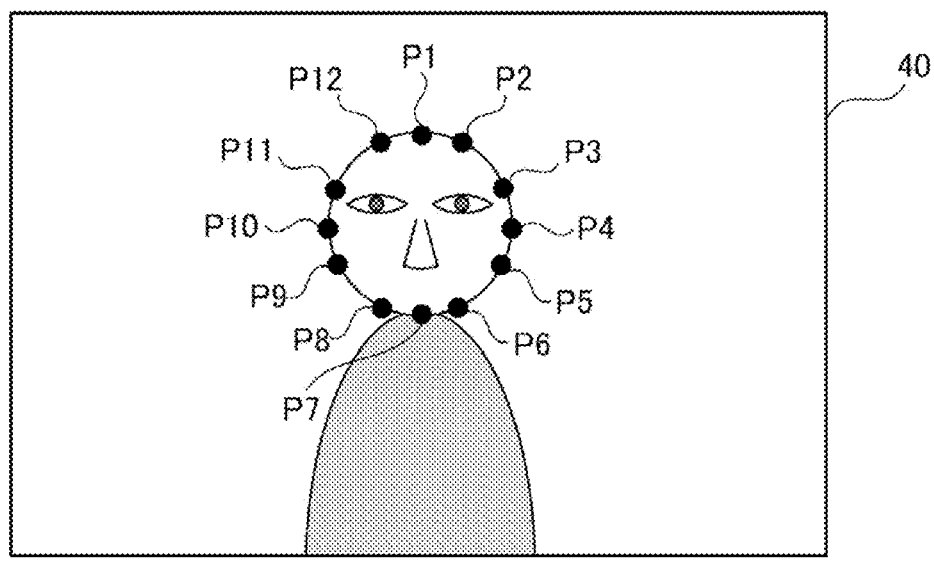
FIG. 5 is a diagram showing positions of feature points detected in the image forming apparatus according to the embodiment of the present disclosure.

The image capturing portion 12 is capable of capturing an image including a face of the user operating the operation portion 11 to generate a captured image 40 (see FIG. 5). The image capturing portion 12 is installed at a position where the image can be captured, such as a position on the upper surface of the image forming apparatus 10.

As shown in FIG. 3, the operation portion 11 and the image capturing portion 12 are electrically connected to the control portion 17. The driving portion 13, the image forming portion 14, the communication I/F 15, and the storage portion 16 are also electrically connected to the control portion 17.

The driving portion 13 is capable of changing the inclination of the operation portion 11. The driving portion 13 includes, for example, a stepping motor that is bidirectionally rotatable, and a gear that causes the operation portion 11 to rotate in response to the rotation of the stepping motor.

The image forming portion 14 is capable of executing a printing process according to image data. The image forming portion 14 includes the image forming units 1 to 4, the intermediate transfer belt 5, the laser scanning unit 6, the secondary transfer roller 7, the fixing device 8, and so forth.

The communication I/F 15 is a communication interface capable of executing communication processing in accordance with a predetermined communications protocol with an information processing device such as an external facsimile device or personal computer via a communication network such as a phone line, the Internet, or a LAN.

The storage portion 16 is a nonvolatile storage portion such as a hard disk or an EEPROM (registered trademark). The storage portion 16 stores various control programs for executing, for example, an inclination control process executed by the control portion 17, which will be described later.

The control portion 17 includes control devices such as a CPU, a ROM, and a RAM. The CPU is a processor that executes various calculation processes. The ROM is a nonvolatile storage portion in which information such as a control program for causing the CPU to execute various processes is stored in advance. The RAM is a volatile or nonvolatile storage portion that is used as a temporary storage memory (work area) for various processes executed by the CPU.

Specifically, the control portion 17 includes a facial orientation detection portion 18 and an inclination control portion 19. Note that the control portion 17 functions as various processing portions by executing various processes in accordance with the control program. The control portion 17 may include an electronic circuit that implements part or a plurality of the processing functions of the processing portions.

The facial orientation detection portion 18 is capable of detecting a facial orientation of the user on the basis of a captured image 40 captured by the image capturing portion 12. The details of the facial orientation detection method used in the facial orientation detection portion 18 will be described later.

The inclination control portion 19 is capable of controlling the driving portion 13 on the basis of the facial orientation detected by the facial orientation detection portion 18. The inclination control portion 19 is capable of controlling the inclination of the operation portion 11 at the desired inclination by controlling the driving portion 13.

Figure 4:
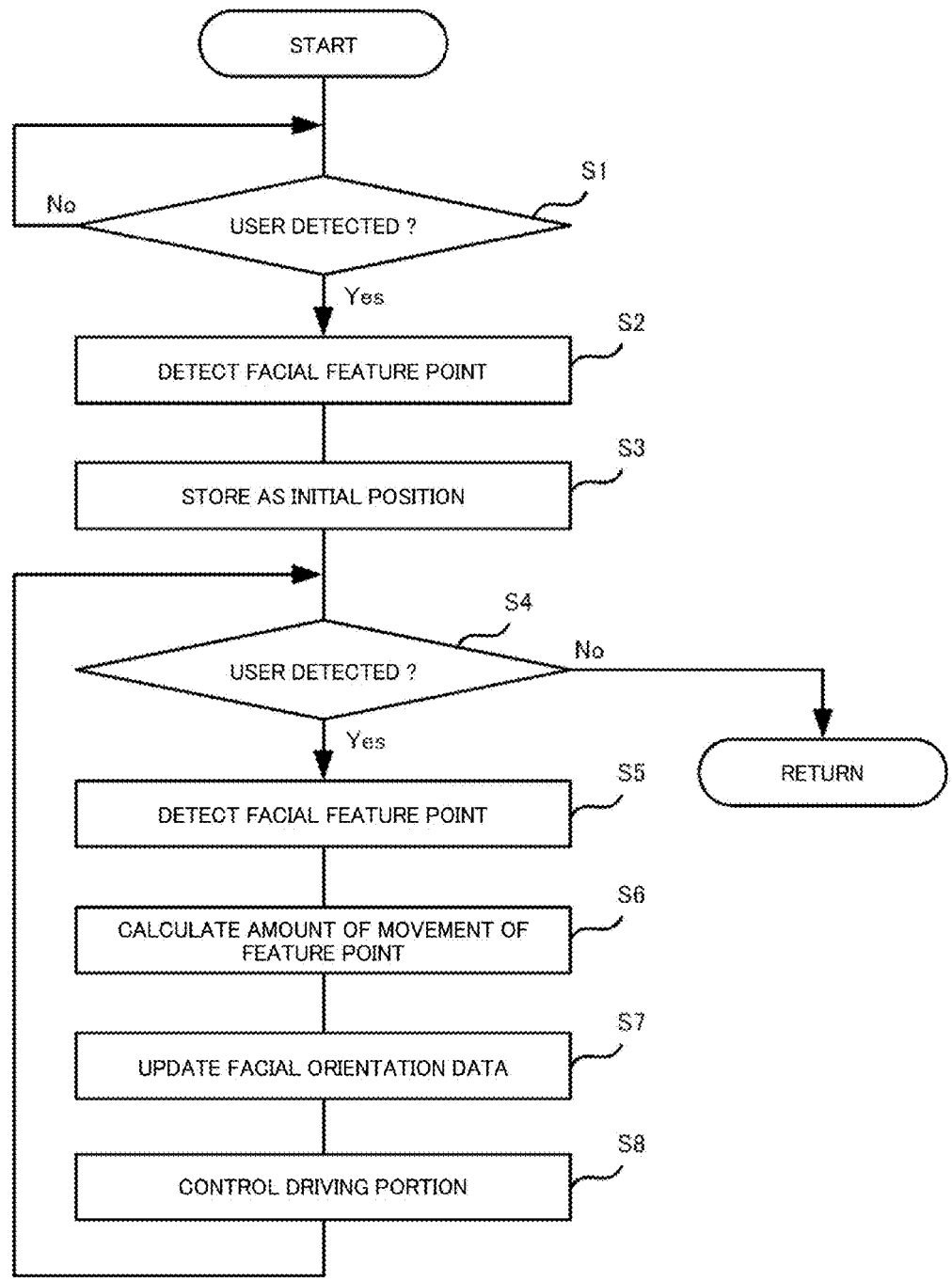
FIG. 4 is a flowchart showing exemplary procedures of an inclination control process executed in the image forming apparatus according to the embodiment of the present disclosure.

In the following, exemplary procedures of an inclination control process executed by the control portion 17 in the image forming apparatus 10 will be described with reference to FIG. 4. Here, steps S1, S2 . . . represent the numbers of processing procedures (steps) executed by the control portion 17.

<Step S1>

First, at step S1, the control portion 17 determines whether a user has been detected. For example, when the user of the image forming apparatus 10 is present near the image forming apparatus 10, the control portion 17 determines that a user has been detected.

Various methods may be used as the method for detecting a user. For example, whether or not a user is present in front of the image forming apparatus 10 may be determined by using an infrared sensor. Alternatively, whether or not the face or the like of a user is contained in a captured image 40 captured by the image capturing portion 12 may be determined. Alternatively, it may be determined that a user is present near the image forming apparatus 10 when a button such as a power switch included in the image forming apparatus 10 is operated.

If it is determined at step S1 that a user has been detected (S1: Yes), the processing proceeds to step S2. On the other hand, the process of step S1 is repeatedly executed until a user is detected (S1: No).

<Step S2>

At step S2, the control portion 17 detects feature points of the face of the user in the image 40 captured by the image capturing portion 12. Specifically, as shown in FIG. 5, the control portion 17 detects a plurality of points on a facial contour of the user in the image 40 as feature points P1 to P12. Here, the feature point P1 is a point at the upper end of the facial contour, the feature point P4 is a point at the right end of the facial contour, the feature point P7 is a point at the lower end of the facial contour, and the feature point P10 is a point at the left end of the facial contour. The feature points P2 and P3 are feature points located on the contour between the feature points P1 and P4, the feature points P5 and P6 are feature points located on the contour between the feature points P4 and P7, the feature points P8 and P9 are feature points located on the contour between the feature points P7 and P10, and the feature points P11 and P12 are feature points located on the contour between the feature points P10 and P1. The positions of the feature points P1 to P12 are represented, for example, by two-dimensional coordinate values.

<Step S3>

At step S3, the control portion 17 stores, in the RAM, the storage portion 16, or the like, the positions of the feature points P1 to P12 detected at step S2 as the initial positions of the feature points.

<Step S4>

At step S4, the control portion 17 determines whether a user has been detected, as in step S1. Then, if it is determined that a user has been detected (S4: Yes), the processing proceeds to step S5. On the other hand, if no user is detected (S4: No), the processing returns to step S1. This means that the user has left the image forming apparatus 10.

<Step S5>

At step S5, the control portion 17 detects feature points of the face of the user in the image 40 captured by the image capturing portion 12, as in step S2. Here, the feature points P1 to P12 are also detected, as in step S2.

<Step S6>

At step S6, the control portion 17 calculates amounts of movement of the feature points P1 to P12 on the basis of the initial positions of the feature points P1 to P12 stored at step S3 and the current positions of the feature points P1 to P12 detected at step S5.

Figure 6:
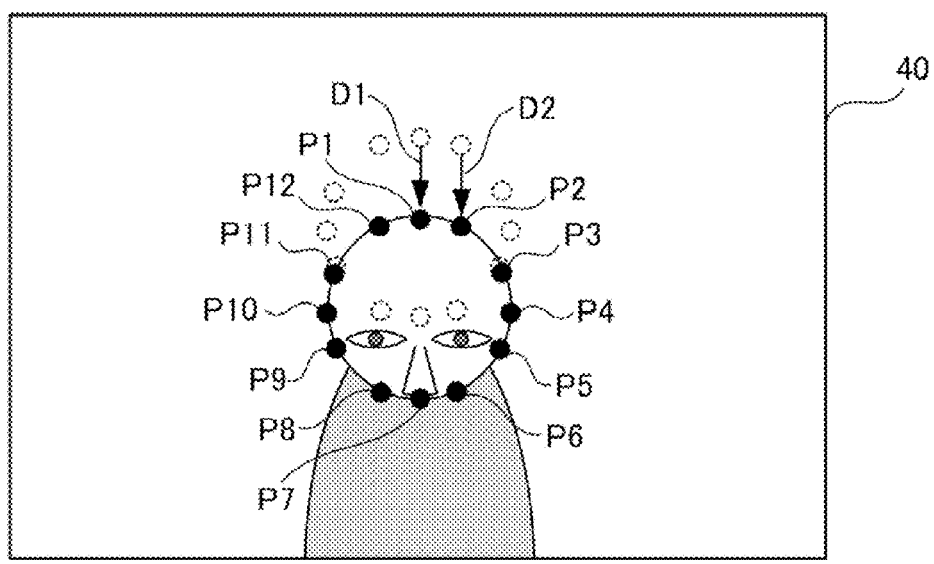
FIG. 6 is a diagram showing amounts of movement of feature points calculated in the image forming apparatus according to the embodiment of the present disclosure.

For example, when a state in which the user looks forward as shown in FIG. 5 is changed to a state in which the user looks downward as shown in FIG. 6, the positions of the feature points P1 to P12 move downward accordingly. Note that the greater the amount of change of the facial orientation of the user, the greater the amounts of movement of the feature points P1 to P12 become.

The control portion 17 calculates an amount of movement from the initial position to the current position for each of the feature points P1 to P12. For example, an arrow D1 shown in FIG. 6 indicates the amount of movement of the feature point P1, and an arrow D2 indicates the amount of movement of the feature point P2. In the present embodiment, it is sufficient that the facial orientation for the up-down direction is calculated, and therefore, the amounts of movement of the feature points P1 to P12 calculated at step S6 may be amounts of movement for the up-down direction.

<Step S7>

At step S7, the control portion 17 calculates the facial orientation of the user on the basis of the amounts of movement of the feature points P1 to P12 calculated at step S6, and updates facial orientation data representing the facial orientation of the user.

The control portion 17 can detect the facial orientation of the user on the basis of, for example, an average value of the amounts of movement of each of the feature points P1 to P12. Of course, the facial orientation of the user may be detected on the basis of a representative value (e.g., a maximum value, a minimum value, a mode) other than an average value.

The control portion 17 can determine that the larger the amounts of movement of the feature points P1 to P12, the more significant the inclination of the face of the user from the initial state (the state shown in FIG. 5) is. In other words, the control portion 17 can detect the facial orientation of the user on the basis of the amounts of movement of the feature points P1 to P12. The control portion 17 updates the facial orientation data representing the facial orientation of the user, on the basis of the detected facial orientation. The facial orientation data is data represented by, for example, an angle or a two-dimensional vector, and is stored in the RAM, the storage portion 16, or the like.

Note that even if the facial orientations of users have changed by the same change amount, the amounts of movement of the feature points P1 to P12 are larger for a user who is closer to the image capturing portion 12. For this reason, in the case where the facial orientation of the user needs to be detected more accurately, the control portion 17 may detect the facial orientation of the user, taking into consideration the distance from the image capturing portion 12 to the face of the user, in addition to the amounts of movement of the feature points P1 to P12. For example, the distance from the image capturing portion 12 to the face of the user may be estimated on the basis of the distance between the feature point P4 and the feature point P10 in the image 40, or may be measured using an infrared range sensor or the like.

Note that the above-described processes of steps S2, S3, and S5 to S7 are executed by the facial orientation detection portion 18 of the control portion 17.

<Step S8>

At step S8, the control portion 17 controls the driving portion 13 on the basis of the facial orientation data updated at step S7.

Figure 7:
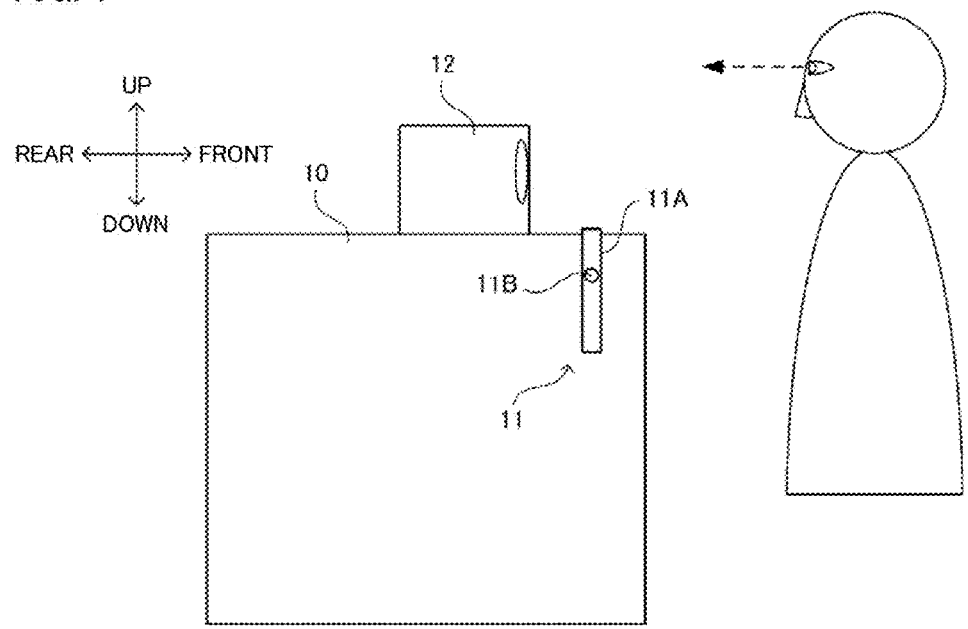
FIG. 7 is a diagram showing movements of the operation portion of the image forming apparatus according to the embodiment of the present disclosure.
Figure 8:
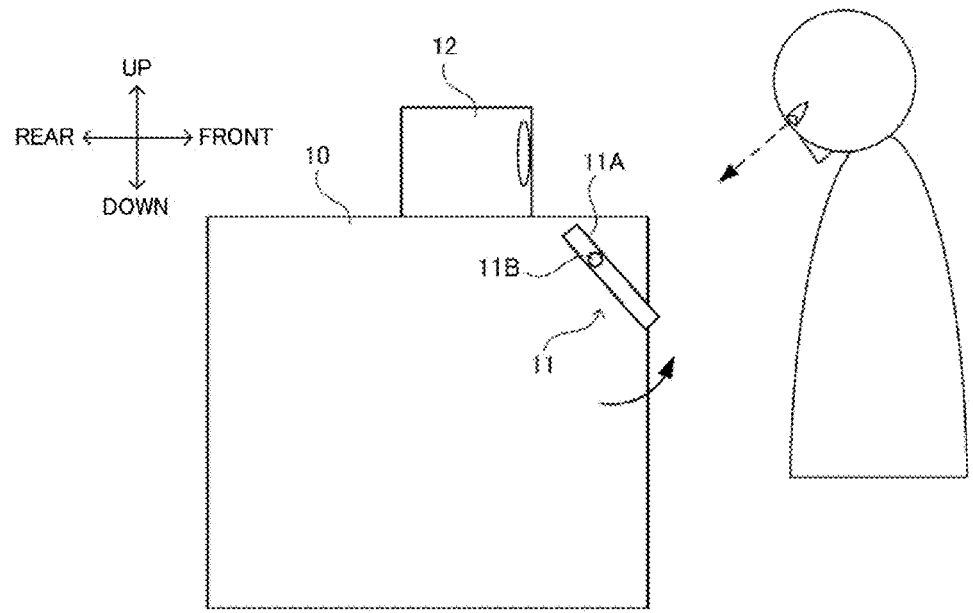
FIG. 8 is a diagram showing movements of the operation portion of the image forming apparatus according to the embodiment of the present disclosure.

Specifically, the control portion 17 controls the driving portion 13 such that the operation surface 11A of the operation portion 11 is perpendicular to the facial orientation of the user, on the basis of the facial orientation data updated at step S7. For example, in a state in which the user faces forward as shown in FIG. 7, the operation surface 11A is parallel to the up-down direction. When the user faces obliquely downward as shown in FIG. 8 from that state, the operation portion 11 rotates such that the operation surface 11A is perpendicular to the facial orientation of the user. Note that the process of step S8 is executed by the inclination control portion 19 of the control portion 17.

When the process of step S8 ends, the processing returns to step S4. As a result, the inclination of the operation portion 11 is automatically controlled according to the facial orientation of the user until the user leaves the image forming apparatus 10.

An image forming system is also known that identifies a user who is approaching the image forming apparatus by performing facial recognition on the basis of an image captured by a video camera provided in the vicinity of the image forming apparatus, and ensures security and performs a print start in a timely manner for a print job issued by the user. With such a facial recognition technique, the image forming apparatus itself needs to be able to use information for identifying the user. In contrast, with the image forming apparatus 10 of the present embodiment, the inclination of the operation portion 11 is automatically controlled according to the facial orientation of the user as described above. This allows the user to comfortably operate the operation portion 11, without the need to identify the user.

A user who is of larger stature can more easily perform an operation with the operation surface 11A facing more upward, as compared with a user who is of shorter stature. However, the position where a user operates the operation surface 11A (the distance between the image forming apparatus 10 and the user) differs from one user to another. Thus, a user operating at a far distance can more easily perform an operation with the operation surface 11A facing more downward, as compared with a user operating at a close distance. Thus, simply controlling the inclination of the operation portion 11 by taking only the height into consideration is not sufficient. In the present embodiment, the facial orientation of the user is detected, and the operation surface 11A is controlled to be perpendicular to the facial orientation, so that it is possible to control the inclination of the operation portion 11 at an optimum inclination for the user.

Figure 9:
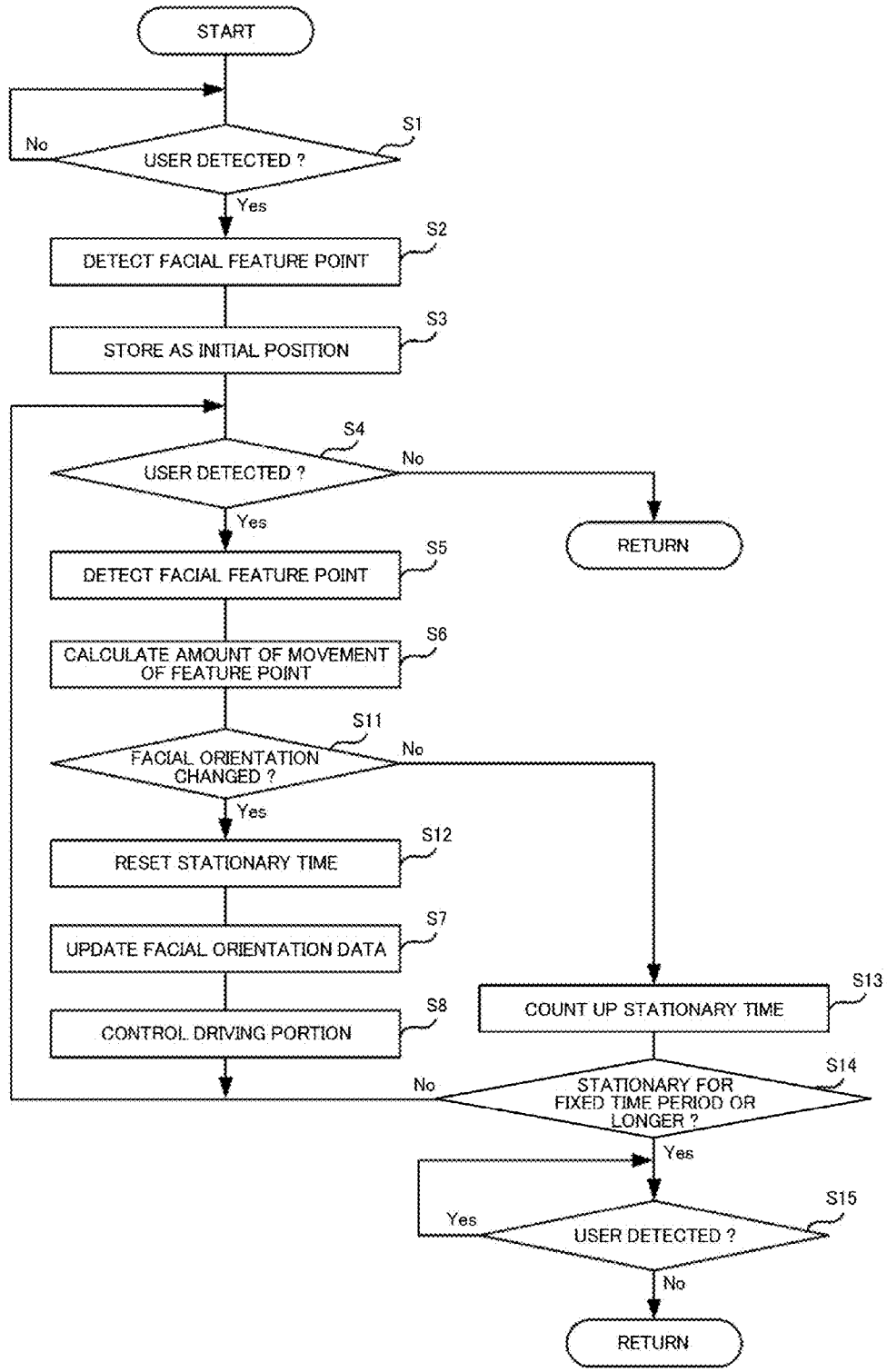
FIG. 9 is a flowchart showing exemplary procedures of a first modification of the inclination control process executed in the image forming apparatus according to the embodiment of the present disclosure.

Next, exemplary procedures of a first modification of the inclination control process executed by the control portion 17 will be described with reference to FIG. 9. In FIG. 9, the same numbers are assigned to the same processing procedures (steps) as those shown in FIG. 4, and the description thereof has been omitted.

<Step S11>

At step S11, the control portion 17 determines whether the facial orientation of the user has changed, on the basis of the amounts of movement calculated at step S6. Specifically, the control portion 17 compares, for example, the previously detected facial orientation with the currently detected facial orientation. Then, the control portion 17 can determine that the facial orientation of the user has changed if the difference between these facial orientations exceeds a predetermined threshold. Otherwise, the control portion 17 can determine that the facial orientation of the user has not changed, or in other words, is stationary.

If it is determined at step S11 that the facial orientation of the user has changed (S11: Yes), the processing proceeds to step S12. On the other hand, if it is determined that the facial orientation of the user is stationary (S11: No), the processing proceeds to step S13.

<Step S12>

At step S12, the control portion 17 resets "stationary time" to 0. The "stationary time" is a variable (counter) for counting the time during which the facial orientation is stationary. In other words, the "stationary time" is reset to 0 if it is determined that the facial orientation of the user has changed.

<Step S13>

At step S13, the control portion 17 counts up the "stationary time".

<Step S14>

At step S14, the control portion 17 determines whether the facial orientation of the user has been stationary for a fixed time period or longer on the basis of the value of the "stationary time". Here, if it is determined that the facial orientation of the user has been stationary for a fixed time period or longer (S14: Yes), the processing proceeds to step S15. On the other hand, if it is determined otherwise (S14: No), the processing returns to step S4.

<Step S15>

At step S15, the control portion 17 determines whether a user has been detected, as in step S4. Then, the process of step S15 is repeatedly executed while a use is detected (S15: Yes). On the other hand, if no user is detected (S15: No), the processing returns to step S1. This means that the user has left the image forming apparatus 10.

Note that the processes of steps S11 to S15 are executed by the inclination control portion 19 of the control portion 17.

As described above, in the first modification of the inclination control process, if the facial orientation of the user has been stationary for a fixed time period or longer, the control of the driving portion 13 at step S8 will not be performed thereafter. In other words, if the facial orientation of the user has been stationary for a fixed time period or longer, the control portion 17 ends the control of the driving portion 13. If the facial orientation of the user has been stationary for a fixed time period or longer, this means that the user is able to view the operation surface 11A in a stable manner. In the first modification, the inclination of the operation portion 11 will not be controlled thereafter, and it is thus possible to prevent the inclination of the operation portion 11 from being changed unnecessarily.

Figure 10:
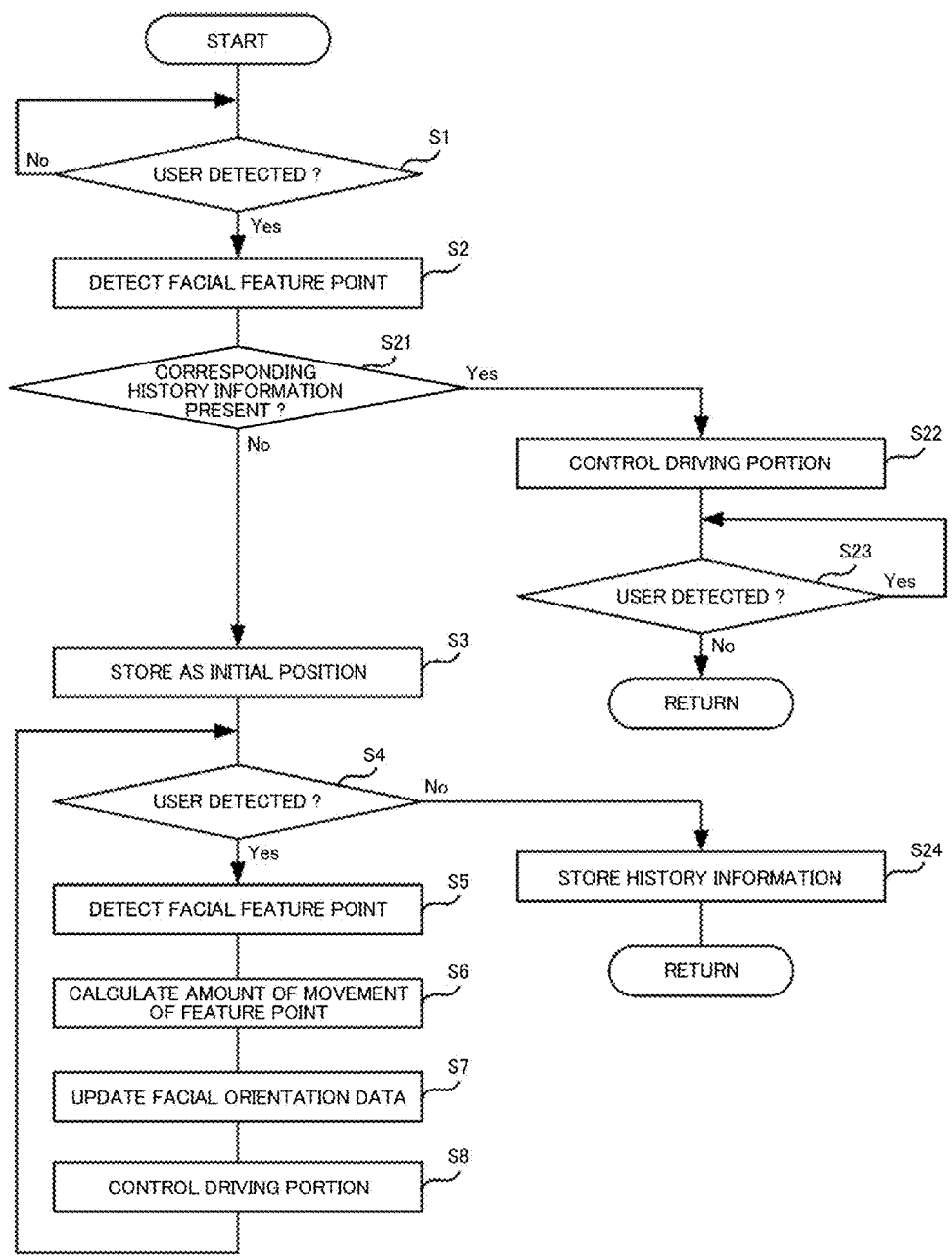
FIG. 10 is a flowchart showing exemplary procedures of a second modification of the inclination control process executed in the image forming apparatus according to the embodiment of the present disclosure.

Next, exemplary procedures of a second modification of the inclination control process executed by the control portion 17 will be described with reference to FIG. 10. In FIG. 10, the same numbers are assigned to the same processing procedures (steps) as those shown in FIG. 4, and the description thereof has been omitted.

<Step S21>

At step S21, the control portion 17 determines whether "history information" corresponding to the facial position and the shape of the facial contour of the user is stored in the storage portion 16 on the basis of the positions of the facial feature points P1 to P12 detected at step S2. The "history information" is, for example, information indicating the correspondence between the positions of the facial feature points P1 to P12 and the inclination of the operation portion 11, and is stored in the storage portion 16 at step S24, which will be described later. The positions of the facial feature points P1 to P12 represent the facial position and the shape of the facial contour of the user.

For example, if the "history information" containing the positions of the facial feature points P1 to P12 matching or similar to the positions of the facial feature points P1 to P12 detected at step S2 is stored in the storage portion 16, the control portion 17 determines that the corresponding "history information" is stored.

If it is determined at step S21 that the corresponding "history information" is stored (step S21: Yes), the processing proceeds to step S22. On the other hand, if it is determined that the corresponding "history information" is not stored (step S21: No), the processing proceeds to step S3.

<Step S22>

At step S22, the control portion 17 controls the driving portion 13 such that the inclination of the operation portion 11 matches the inclination indicated by the corresponding "history information".

<Step S23>

At step S23, the control portion 17 determines whether a user has been detected, as in step S4. Then, the process of step S23 is repeatedly executed while a user is detected (S23: Yes). On the other hand, if no user is detected (S23: No), the processing returns to step S1. This means that the user has left the image forming apparatus 10.

<Step S24>

At step S24, the control portion 17 stores, in the storage portion 16, the positions of the facial feature points P1 to P12 detected at step S2 and the inclination of the operation portion 11 at the current time in association, as "history information". In other words, "history information" is information associating the facial position and the shape of the facial contour of a user with the inclination of the operation portion 11 when the user has left the image forming apparatus 10 (i.e., the inclination of the operation portion 11 that has undergone the processes of steps S3 to S8, and has been adjusted to an inclination that provides easy viewing for the user. When the process of step S24 ends, the processing returns to step S1.

Note that the processes of steps S21 to S24 are executed by the inclination control portion 19 of the control portion 17.

Figure 11:
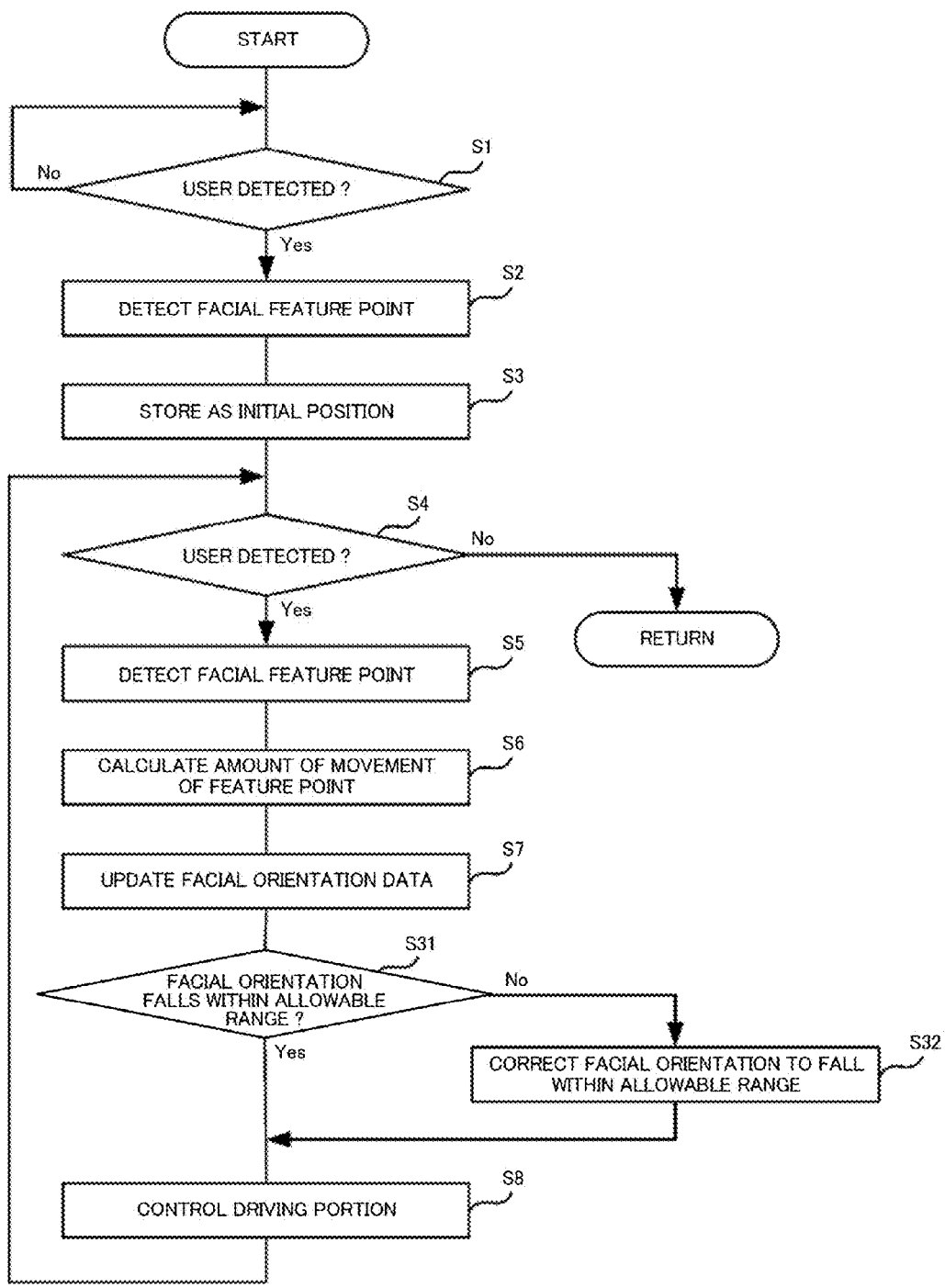
FIG. 11 is a flowchart showing exemplary procedures of a third modification of the inclination control process executed in the image forming apparatus according to the embodiment of the present disclosure.

As described above, in the second modification of the inclination control process, if the "history information" corresponding to the positions of the facial feature points P1 to P12 detected at step S2 is stored, the processes of steps S3 to S7 (i.e., the processes for detecting the facial orientation) are omitted, and the inclination of the operation portion 11 is controlled on the basis of the "history information". Thus, if the facial position and the shape of the facial contour of a user in the image 40 correspond to the facial position and the facial contour of a user that were detected in the past, these users are regarded to be identical, so that the detection of the facial orientation is omitted, and the inclination of the operation portion 11 is promptly changed to an inclination that provides easy viewing for the user Next, exemplary procedures of a third modification of the inclination control process executed by the control portion 17 will be described with reference to FIG. 11. In FIG. 11, the same numbers are assigned to the same processing procedures (steps) as those shown in FIG. 4, and the description thereof has been omitted.

<Step S31>

At step S31, the control portion 17 determines whether the facial orientation (i.e., the facial orientation indicated by the facial orientation data) of the user is within a predetermined allowable range on the basis of the facial orientation data updated at step S7. For example, if the facial orientation of the user is within a fixed predetermined angle from a straightforward direction, the control portion 17 determines that the facial orientation is within the allowable range.

If it is determined at step S31 that the facial orientation of the user is within the allowable range (step S31: Yes), the processing proceeds to step S8. On the other hand, if it is determined that the facial orientation of the user exceeds the allowable range (step S31: No), the processing proceeds to step S32.

<Step S32>

At step S32, the control portion 17 corrects the facial orientation data such that the facial orientation of the user falls within the allowable range. For example, when the allowable range is within 60 degrees from the straightforward direction, the control portion 17 corrects the facial orientation data such that the facial orientation indicated by the facial orientation data is in a direction 60 degrees to the straightforward direction.

Note that the processes of steps S31 and S32 are executed by the inclination control portion 19 of the control portion 17.

As described above, in the third modification of the inclination control process, if the facial orientation indicated by the facial orientation data updated at step S7 exceeds a predetermined allowable range, the facial orientation data is corrected such that the facial orientation falls within the allowable range, and the driving portion 13 is controlled such that the operation surface 11A is perpendicular to the facial orientation indicated by the corrected facial orientation data. Thus, if the facial orientation of the user exceeds the allowable range, the operation surface 11A will not be in a direction perpendicular to the facial orientation of the user. As a result, the user changes his or her facial position in order to view the operation surface 11A from a direction perpendicular to the operation surface 11A, so that the facial orientation will fall within the allowable range. Therefore, it is possible to achieve an effect of inhibiting the user from performing an operation in an unnatural posture that causes a strain on the neck.

Although the facial orientation of the user is detected on the basis of the amounts of movement of the feature points P1 to P12 in the image 40 in the present embodiment, the present disclosure is not limited thereto. For example, the facial orientation of the user may be detected on the basis of relative positions of eyes, a nose, or the like to the facial contour in the image 40.

Although the facial orientation of the user is detected on the basis of 12 data pieces of the feature points P1 to P12 in the present embodiment, the present disclosure is not limited thereto. At least one data piece may be provided for each of the feature points P1, P4, P7, and P10, which constitute upper, right, lower, and left ends of the face of the user. In the case of using 12 data pieces of the feature points P1 to P12, two feature points adjacent to each of the feature points P1, P4, P7, and P10 on opposite sides along the facial contour will be provided. Accordingly, three feature points will be present in each of the upper, lower, left, and right regions of the face of the user, making it possible to increase the detection accuracy of the facial orientation of the user.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an operator including an operation surface to be operated by a user;
   an image capturer configured to capture an image including a face of the user operating the operator;
   a driver configured to change an inclination of the operator;
   a facial orientation detector configured to detect a facial orientation of the user on the basis of the image; and
   an inclination controller configured to control the driver on the basis of the facial orientation detected by the facial orientation detector, wherein the facial orientation detector is configured to detect the facial orientation of the user on the basis of an amount of movement of a feature point of the face of the user in the image.

2. The image forming apparatus according to claim 1, wherein the feature point is a point on a facial contour.

3. The image forming apparatus according to claim 1, wherein the facial orientation detector is configured to detect the facial orientation of the user on the basis of an amount of movement of a feature point of the face of the user in the image and a distance from the image capturer to the face of the user.

4. An image forming apparatus comprising:
   an operator including an operation surface to be operated by a user;
   an image capturer configured to capture an image including a face of the user operating the operator;
   a driver configured to change an inclination of the operator;
   a facial orientation detector configured to detect a facial orientation of the user on the basis of the image; and
   an inclination controller configured to control the driver on the basis of the facial orientation detected by the facial orientation detector, wherein the inclination controller is configured to end control of the driver if the facial orientation detected by the facial orientation detector has been stationary for a fixed time period or longer.

* * * * *